United States Patent
Watanabe et al.

(10) Patent No.: US 9,442,316 B2
(45) Date of Patent: Sep. 13, 2016

(54) DISPLAY DEVICE COMPRISING A LIGHT-TRANSMITTING COVER HAVING A LENS PORTION

(71) Applicant: Sharp Kabushiki Kaisha, Osaka-shi, Osaka (JP)

(72) Inventors: Hisashi Watanabe, Osaka (JP); Yuhzoh Fujimura, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 56 days.

(21) Appl. No.: 14/401,594

(22) PCT Filed: May 16, 2013

(86) PCT No.: PCT/JP2013/063694
§ 371 (c)(1),
(2) Date: Nov. 17, 2014

(87) PCT Pub. No.: WO2013/172423
PCT Pub. Date: Nov. 21, 2013

(65) Prior Publication Data
US 2015/0138484 A1 May 21, 2015

(30) Foreign Application Priority Data
May 18, 2012 (JP) .................... 2012-114823

(51) Int. Cl.
*G02F 1/1333* (2006.01)
*G02F 1/1335* (2006.01)

(52) U.S. Cl.
CPC ... *G02F 1/133308* (2013.01); *G02F 1/133526* (2013.01); *G02F 2001/13332* (2013.01); *G02F 2001/133331* (2013.01); *G02F 2001/133388* (2013.01); *G02F 2201/46* (2013.01)

(58) Field of Classification Search
CPC ......... G02F 2001/13332; G02F 2001/133388; G02F 2001/133331
See application file for complete search history.

(56) References Cited

U.S. PATENT DOCUMENTS 6,927,908 B2 8/2005 Stark
7,443,463 B2 10/2008 Chang et al.
8,472,114 B2 6/2013 Watanabe
(Continued)

FOREIGN PATENT DOCUMENTS

JP 05-188873 A 7/1993
JP 06-337411 A 12/1994
(Continued)

OTHER PUBLICATIONS

Official Communication issued in International Patent Application No. PCT/JP2013/063694, mailed on Jul. 9, 2013.

*Primary Examiner* — Paul Lee
(74) *Attorney, Agent, or Firm* — Keating & Bennett, LLP

(57) ABSTRACT

This display device (100) includes: a display panel (10); a light-transmitting cover (20) which is arranged closer to a viewer than the display panel is so as to cover the display panel and which includes a lens portion at a position corresponding to an end portion of the display panel; and a bezel (30) including a side frame portion which covers the side surface of the display panel at least partially. The bezel (30) further includes a fixing portion (34) which is arranged at the tip of the side frame portion and in the vicinity of the side surface of the light-transmitting cover. The light-transmitting cover (20) and the fixing portion (34) of the bezel (30) are directly fixed to each other.

13 Claims, 14 Drawing Sheets

(56) References Cited

U.S. PATENT DOCUMENTS

| | | |
|---|---|---|
| 8,692,737 B2 | 4/2014 | Watanabe et al. |
| 2003/0026109 A1 | 2/2003 | Takayanagi et al. |
| 2004/0051944 A1 | 3/2004 | Stark |
| 2009/0257010 A1 | 10/2009 | Sakurai |
| 2011/0242686 A1 | 10/2011 | Watanabe |
| 2011/0285934 A1* | 11/2011 | Watanabe ......... G02F 1/133526 349/58 |
| 2012/0049718 A1 | 3/2012 | Watanabe et al. |
| 2013/0242230 A1 | 9/2013 | Watanabe |

FOREIGN PATENT DOCUMENTS

| | | |
|---|---|---|
| JP | 2003-043453 A | 2/2003 |
| JP | 2004-524551 A | 8/2004 |
| JP | 2009-251550 A | 10/2009 |
| WO | 2009/157150 A1 | 12/2009 |
| WO | 2010/070871 A1 | 6/2010 |
| WO | 2010/122781 A1 | 10/2010 |
| WO | 2012/073929 A1 | 6/2012 |

* cited by examiner (a)

(b)

(c)

(a)

(b)

(c)

(a)

(b)

(c)

(a)

(b)

(a)

(b)

DISPLAY DEVICE COMPRISING A LIGHT-TRANSMITTING COVER HAVING A LENS PORTION

TECHNICAL FIELD

The present invention relates to a display device and more particularly relates to a display device with a light-transmitting cover.

BACKGROUND ART

Liquid crystal display devices with a huge screen have been used as display devices for amusement facilities, information displays, digital signages and so on. While these applications are expanding, some people attempt to realize a pseudo-display device with a huge display screen by assembling a number of liquid crystal display devices densely together with no gaps left between them (which will be sometimes hereinafter referred to as a "tiling technique"). Such an arrangement is sometimes called a "multi-display system" (or a "multi-screen system") and has attracted a lot of attention these days as a scheme for providing a high-definition huge screen.

In such a multi-display system, however, the seam between adjacent display devices is often easily sensible to the viewer's eye, which is a problem. Now it will be described how and why such a problem arises in a liquid crystal display device, for example.

A liquid crystal display device includes an liquid crystal panel, a backlight unit, circuits and power supplies for supplying various kinds of electrical signals to the liquid crystal panel, and a housing or bezel (such as a rim member or a frame member) to house all of these components.

The liquid crystal panel includes a display area in which a plurality of pixels are arranged and a frame area which surrounds the display area. In the display area (active area), pixel electrodes, TFTs and other members are arranged and an image or video is displayed. In the frame area, on the other hand, arranged are a seal member to seal a liquid crystal material between the substrates, wiring connected to scan lines and signal lines, and terminals to be connected to an external driver circuit. In addition, to prevent the display quality from being debased on the periphery of the display area, an opaque member is often provided in the frame area.

The frame area is an area that does not contribute to a display operation (i.e., a non-display area), and therefore, is sensed to the viewer's eyes as a non-display area (black frame) representing the seams of the display device. If the frame area can be narrowed, then the seams will be less sensible to the eye. However, even though the frame area of display devices has been narrowed year after year, it is impossible in principle to eliminate the frame area altogether.

Methods for making those seams less sensible to the eye in display devices which form a multi-display system have been studied in the related art. For example, Patent Documents Nos. 1 and 2 disclose a technique for making the seams less sensible to the eye by providing a light-transmitting cover for each display panel so that the cover is located closer to the viewer than the display panel is.

The end portion of the light-transmitting cover disclosed in Patent Documents Nos. 1 and 2 includes a curved portion which functions as a lens. That curved portion (lens portion) of the light-transmitting cover is typically arranged to cover not only the frame area of the display panel but also a part of the display area near the frame area (which will be sometimes hereinafter referred to as a "peripheral display area"). Part of the light that has gone obliquely out of pixels that are arranged in the peripheral display area (which will be hereinafter referred to as "peripheral pixels") is incident on the light-transmitting cover and then refracted by the lens portion toward the frontend of the panel. As a result, it looks to the viewer's eye as if an image was being displayed on the frame area, too, thus providing an image, of which the seams are less sensible to the viewer's eye.

It should be noted that such a problem of easily sensible seams (or the problem that the frame area cannot be narrowed beyond a certain limit) arises in not only liquid crystal display devices but also whenever a number of direct-viewing display devices, including PDP (plasma display panels) organic EL display devices, and electrophoretic display devices, are tiled together. In any case, the seams can be made less sensible to the eye by using a light-transmitting cover with a lens described above.

On top of that, not just display devices for use to make up a multi-display system but also a display device to be used by itself are required to narrow their frame area as much as possible. That is why it is advantageous to use such a light-transmitting cover with a lens, because an image can also be displayed in the frame area in that case.

CITATION LIST

Patent Literature

Patent Document No. 1: PCT International Application Japanese National Phase Publication No. 2004-524551 (U.S. Pat. No. 6,927,908)
Patent Document No. 2: U.S. Pat. No. 7,443,463

SUMMARY OF INVENTION

Technical Problem

When a light-transmitting cover is used, however, the light-transmitting cover needs to be fixed firmly with respect to the display panel. Particularly when a large and heavy light-transmitting cover is used, the light-transmitting cover might drop off the display panel depending on how the cover is fixed if the assembly is arranged with the longer sides running horizontally, for example.

The present inventors perfected our invention to overcome such a problem by providing a display device in which a light-transmitting cover is fixed appropriately onto a display panel.

Solution to Problem

A display device according to an embodiment of the present invention includes: a display panel; a light-transmitting cover which is arranged closer to a viewer than the display panel so as to cover the display panel and which includes a lens portion at a position corresponding to an end portion of the display panel; and a bezel including a side frame portion which covers a side surface of the display panel at least partially. The bezel further includes a fixing portion which is arranged at a tip of the side frame portion and in the vicinity of the side surface of the light-transmitting cover. The light-transmitting cover and the fixing portion of the bezel are directly fixed to each other.

In one embodiment, a viewer-side surface of the display panel and a back surface of the light-transmitting cover are not directly fixed to each other.

In one embodiment, the fixing portion of the bezel is arranged so as to project out of the viewer-side surface of the display panel.

In one embodiment, the display panel has a display area and a non-display area which is arranged outside of the display area, and the fixing portion of the bezel is arranged at such a position as not to prevent light that has been emitted from the end of the display area from passing through the lens portion of the light-transmitting cover and then traveling perpendicularly to the display panel.

In one embodiment, the light-transmitting cover includes a notched portion, which is directly fixed onto the fixing portion of the bezel.

In one embodiment, the fixing portion of the bezel has a bent tip portion, the notched portion of the light-transmitting cover has a groove, of which the shape matches the shape of the bent tip portion, and the bent tip portion and the notched portion are fitted into each other.

In one embodiment, a gap is left between an end of the bent tip portion and a bottom of the groove of the notched portion of the light-transmitting cover.

In one embodiment, the display device further includes a metallic member which covers the notched portion of the light-transmitting cover at least partially.

In one embodiment, the fixing portion of the bezel has a hole which faces the light-transmitting cover, and the bezel and the light-transmitting cover are secured to each other with a fixing member that passes through the hole.

In one embodiment, the light-transmitting cover and the bezel are bonded together with an adhesive member interposed between the fixing portion of the bezel and the light-transmitting cover.

In one embodiment, the display panel has a substantially rectangular planar shape, the bezel includes first and second bezel portions which are arranged so as to respectively face first and second sides of the display panel that are opposed to each other, and the first and second bezel portions have mutually different thicknesses.

In one embodiment, the display panel has a display area and a non-display area which is arranged outside of the display area. The width of the non-display area is broader on the first side than on the second side. A terminal region is arranged in the non-display area along the first side. And the first bezel portion is less thick than the second bezel portion.

In one embodiment, a central portion of the light-transmitting cover has been formed to be thinner than a peripheral portion of the light-transmitting cover.

In one embodiment, a gap is left between a viewer-side surface of the display panel and a back surface of the light-transmitting cover and is filled with the air.

In one embodiment, a gap is left between the viewer-side surface of a display panel and a back surface of the light-transmitting cover and is filled with a filler, of which the refractive index is greater than 1.0.

In one embodiment, the shear storage modulus G' of the filler is equal to or smaller than $10^6$ Pa.

In one embodiment, the material of which the viewer-side surface of the display panel is made is different from the material of which the back surface of the light-transmitting cover is made.

ADVANTAGEOUS EFFECTS OF INVENTION

In a display device according to an embodiment of the present invention, a light-transmitting cover with a lens function can be fixed appropriately onto a display panel.

DESCRIPTION OF EMBODIMENTS

The applicant of the present application proposed, in PCT International Application Publication No. 2012/073929, that a light-transmitting cover be fixed onto a display panel by adhering the light-transmitting cover onto the surface of the display panel with either a photocurable resin material or a double-coated adhesive sheet. In any of these methods, the light-transmitting cover is directly bonded onto the surface of the display panel.

Figure 1:
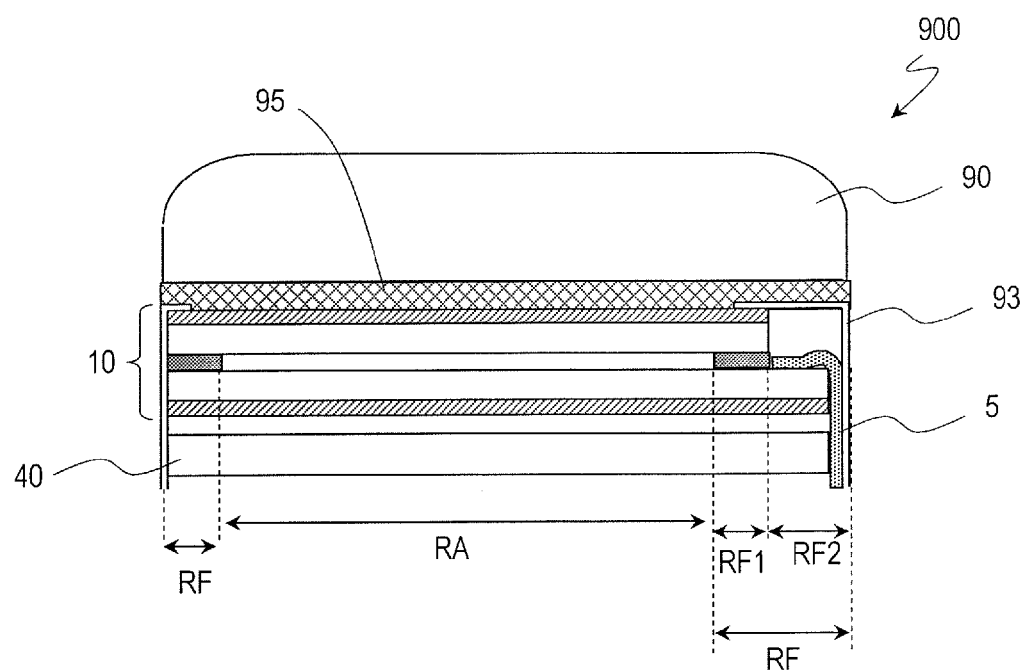
FIG. 1 A cross-sectional view illustrating a liquid crystal display device 900 as a comparative example.

FIGS. 1 illustrates an example (which will be hereinafter referred to as a "display device 900 as a comparative example") in which a light-transmitting cover 90 and a liquid crystal panel (display panel) 10 are directly bonded to each other with an adhesive layer 95. The adhesive layer 95 is formed by applying a photocurable resin onto the surface of the liquid crystal panel 10 and onto a bezel 93 which covers the outer side surface of the liquid crystal panel 10 and then curing the resin with an ultraviolet ray, for example.

However, if the light-transmitting cover 90 has a heavy weight, the light-transmitting cover 90 could peel off due to its own weight when the display device 900 is arranged with the longer sides running horizontally, for example.

To avoid such a situation, an adhesive layer with a higher degree of adhesiveness (i.e., a harder adhesive) could be used. However, the present inventors confirmed that no matter how much the adhesiveness was increased, if the upper surface of the display panel and the lower surface of the light-transmitting cover were made of mutually different materials, the light-transmitting cover could still drop off in some cases. This point will be described in further detail below.

If the surface of the display panel and the back surface of the light-transmitting cover are made of mutually different materials (e.g., glass and acrylic materials, respectively), their thermal expansion coefficients and degrees of hygroscopicity are often different from each other. In that case, if the temperature or humidity changes, stress will be caused due to the difference in their thermal expansion coefficient. For example, suppose the light-transmitting cover is made of an acrylic material and the display panel is made of glass. In that case, the acrylic material and glass have significantly different thermal expansion coefficients. Specifically, an acrylic plate has a thermal expansion coefficient of approximately $7 \times 10^{-5}$ at 20° C., while a glass plate has a thermal expansion coefficient of approximately $0.9 \times 10^{-5}$.

If two materials have different thermal expansion coefficients, their sizes will become significantly different from each other when the temperature changes. For example, if the temperature rises from 20° C. to 60° C., a glass plate which is approximately the size of the protective glass of a 60 inch display panel will expand by only 0.5 mm, whereas an acrylic plate of the same size will expand by as much as 3.6 mm.

In that case, thermal stress will be caused due to a difference in their thermal expansion coefficient between the liquid crystal panel 10 and light-transmitting cover 90 that are bonded to each other. As a result, either the light-transmitting cover 90 or the liquid crystal panel 10 will be deformed and flexed, and the degree of adhesiveness will decrease significantly where the liquid crystal panel 10 and the light-transmitting cover 90 are bonded to each other. Consequently, the light-transmitting cover may drop off in some cases. Also, if a highly hygroscopic material such as an acrylic material is used, then the light-transmitting cover 90 or the liquid crystal panel 10 will be deformed and get swollen even at an ordinary temperature due to its hygroscopicity, and eventually, the light-transmitting cover may drop off.

However, the present inventors studied this problem to discover that if the bezel arranged outside of a display panel was used to fix the light-transmitting cover thereon, the light-transmitting cover could be fixed with good stability even when the surrounding temperature changed.

A display device as an embodiment of the present invention adopts a configuration in which the light-transmitting cover and the display panel are not directly fixed (or bonded) to each other on purpose but are loosely fitted into each other while keeping them relatively movable to each other. As a result, the light-transmitting cover can be fixed with more stability onto even a display with a huge screen such as a one used in a multi-display system.

Embodiments of the present invention will now be described with reference to the accompanying drawings. It should be noted, however, that the present invention is in no way limited to the embodiments to be described below.

(Embodiment 1)

Figure 2:
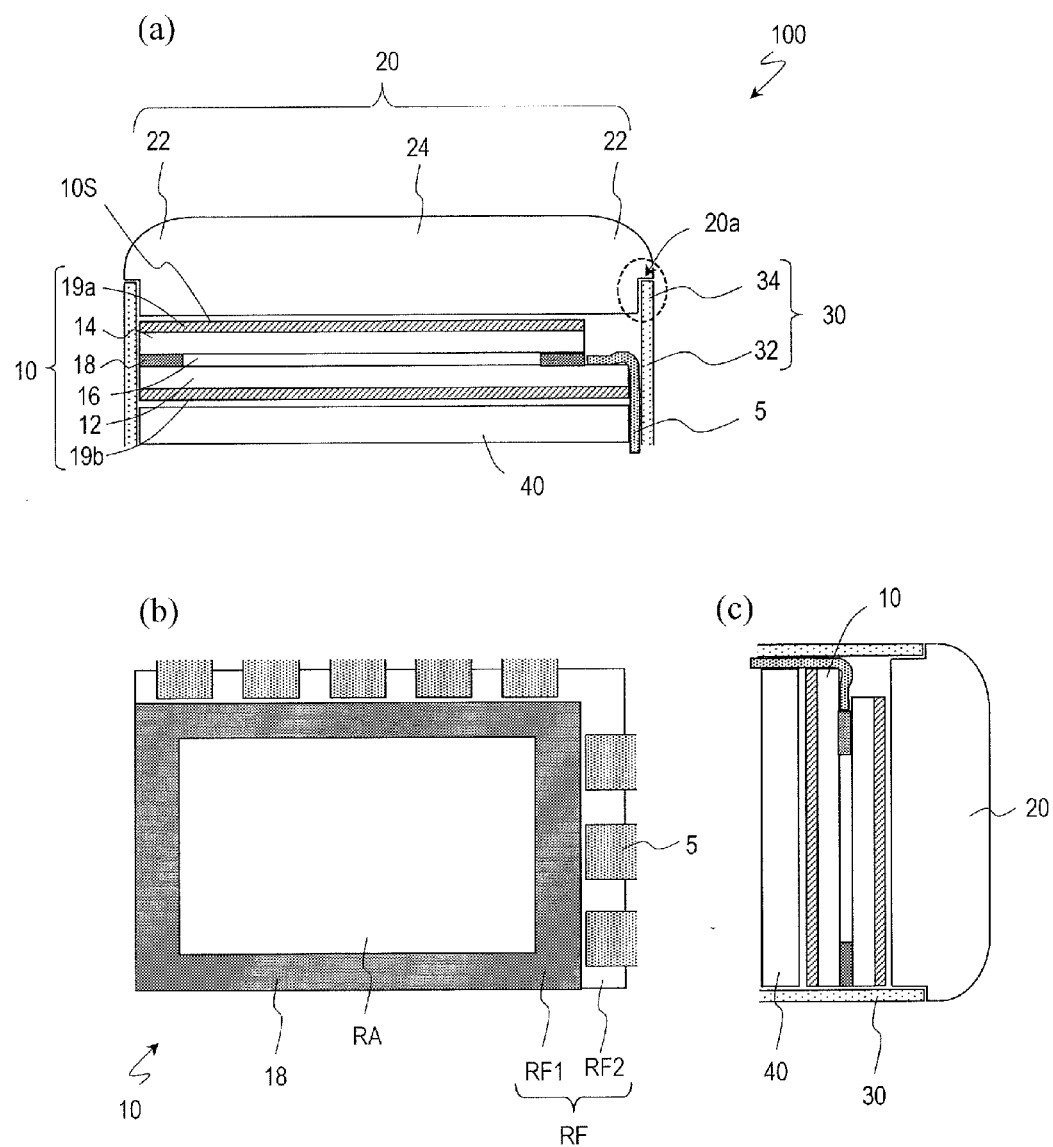
FIG. 2 Illustrates a liquid crystal display device 100 as a first embodiment of the present invention, wherein (a) and (c) are cross-sectional views as viewed horizontally and vertically to the panel, and (b) is a plan view of its liquid crystal panel 10.

FIGS. 2(*a*) to 2(*c*) illustrate a liquid crystal display device 100 as an exemplary display device according to a first embodiment. This liquid crystal display device 100 includes a liquid crystal panel 10 functioning as a display panel, a light-transmitting cover 20 which is arranged closer to the viewer than the liquid crystal panel 10 is, and a backlight 40 which is arranged behind the liquid crystal panel 10. This liquid crystal display device 100 is a transmission type and conducts a display operation by getting the light emitted from the backlight 40 modulated by the liquid crystal panel 10 and letting the modulated light go out of the panel through the light-transmitting cover 20.

The liquid crystal display device 100 further includes a bezel 30 which is arranged so as to surround the side surface of the liquid crystal panel 10 and other members. This bezel 30 forms part of a housing to house and store the liquid crystal panel 10 and backlight 40 inside. In this description, the "bezel" will refer herein to a member which forms part of a housing and which is used to house and store the liquid crystal panel 10. And the liquid crystal panel 10 is fixed onto the bezel 30.

As shown in FIG. 2(*a*), the liquid crystal panel 10 includes a TFT substrate 12, a counter substrate 14, and a liquid crystal layer 16 which is interposed and sealed with a seal member 18 between those substrates. The liquid crystal panel 10 further includes a polarizer 19*b* on the TFT substrate 12 and a polarizer 19*a* on the counter substrate 14. Although these polarizers 19*a* and 19*b* are arranged outside of the TFT substrate 12 and counter substrate 14 in the embodiment illustrated in FIG. 2, the polarizers 19*a* and 19*b* may also be provided inside the TFT substrate 12 and counter substrate 14 (i.e., to face the liquid crystal layer 16) instead.

These two polarizers 19*a* and 19*b* are typically provided for the TFT substrate 12 and counter substrate 14 so that their transmission axes (i.e., polarization axes) cross each other at right angles. In this description, the liquid crystal panel 10 including optical film layers such as the polarizers 19*a* and 19*b* will also be sometimes hereinafter referred to as a "liquid crystal panel 10".

The TFT substrate 12 has been fabricated using a transparent substrate which is typically a glass substrate. On this transparent substrate, TFTs, pixel electrodes and other members are arranged on a pixel-by-pixel basis. The counter substrate 14 has also been fabricated using a transparent substrate such as a glass substrate. On this transparent substrate, a color filter layer, a counter electrode (common electrode) and other members are arranged. Optionally, the liquid crystal panel 10 may be a known liquid crystal panel and may have the same configuration as a liquid crystal display device (with a product number PN-V602) for a multi-display system which is on sale by the applicant of the present application.

The liquid crystal panel 10 has a display area RA and a frame area (non-display area) RF which is arranged outside of the display area RA. In the display area RA, a number of pixels are arranged in matrix and image or video is displayed.

The frame area RF, on the other hand, has an opaque region RF1 and a terminal region RF2. Either a seal member 16 or an opaque member (such as a black matrix) is arranged in the opaque region RF1, and terminals, lines and other members to be connected to flexible printed circuit boards (FPCs) 5 are arranged in the terminal region RF2.

In some cases, the terminal region RF2 may be connected to a TAB (tape carrier package) or a COF (chip on film) instead of the FPCs 5. Furthermore, in the terminal region RF2, a driver IC chip may be COG mounted or a monolithic driver circuit to be formed directly on the substrate may be provided, too.

Through the terminals, lines and other members arranged in the terminal region RF2, a source signal, a gate signal and other signals are input to pixels from an external driver circuit. In the liquid crystal display device 100 of this embodiment, the liquid crystal panel 10 has a rectangular planar shape and the terminal region RF2 is provided in only one of two opposing sides (i.e., upper and lower sides or the right and left sides). As a result, the frame area RF comes to have a broader width on one side (i.e., on the upper side and right side in FIG. 2(b)) than on the other side (i.e., on the lower side and left side in FIG. 2(b)).

The light-transmitting cover 20 is comprised of a lens portion 22 with a convex curved surface and a flat portion 24 with a flat surface. The flat portion 24 covers the display area RA of the liquid crystal panel 10 entirely. The lens portion 22 is arranged so as to run along the boundary between the display area RA and the frame area RF (or along the respective sides of the liquid crystal panel 10) in the vicinity of the boundary. The lens portion 22 is typically arranged so as to overlap both the peripheral pixel region in the display area RA of the liquid crystal panel 10 and the frame area RF when viewed along a normal to the panel screen. And the lens portion 22 can refract the light coming from the peripheral pixel region and can display an image even on the frame area RF.

The lens portion 22 is arranged in a cylindrical shape (e.g., in the shape of four divided circular cylinders) so as to run along the respective sides of the rectangular liquid crystal panel 10 as described above. At each corner portion of the panel, however, the lens portion 22 may be formed so as to form part of a body of rotation (such as a sphere). As a result, the light coming from the display panel can be diagonally refracted appropriately at the corner portions and an appropriate image can be displayed on the frame area at the corner portions.

The light-transmitting cover 20 may be made of any of various materials as long as the material has light-transmitting property. Examples of suitable materials for the light-transmitting cover 20 include an acrylic resin, a polycarbonate resin, a styrene based resin, an olefin based resin, silicone gel and glass.

Optionally, the light-transmitting cover 20 may be used in place of a protective glass plate to protect the display panel 10. In that case, however, if an acrylic resin is used, then the strength will be insufficient. For that reason, the light-transmitting cover 20 is suitably made of polycarbonate or tempered glass with higher strength.

As can be seen, in this embodiment, the light-transmitting cover 20 may be made of any of various materials. If glass is used as a material for the light-transmitting cover 20, then there will be no difference in thermal expansion coefficient between the light-transmitting cover 20 and the glass substrate which forms part of (the TFT substrate and counter substrate of) the liquid crystal panel, and therefore, their deformation (or strain) will be almost the same degree when they expand. That is why even if the light-transmitting cover 20 is bonded onto the liquid crystal panel 10 with an adhesive, there will be slimmer chances that the light-transmitting cover 20 gets flexed and drops off when expanded. When glass is used, however, the overall weight increases and it becomes more difficult to form the cover into an intended shape. That is why in some cases, it is not appropriate to make the light-transmitting cover 20 of glass.

On the other hand, if the light-transmitting cover 20 is made of an acrylic resin, its transparency is almost as high as that of glass, and yet the acrylic resin is lighter than glass, which is certainly beneficial. However, its thermal expansion coefficient is quite different from that of the glass substrates. That is why if the acrylic resin cover is directly joined with the glass substrate, the light-transmitting cover 20 may get deformed and drop off when the surrounding temperature changes. For that reason, to fix the light-transmitting cover 20 with good stability, sometimes it is not appropriate to directly join the light-transmitting cover 20 and the liquid crystal panel 10 together.

Now it will be described how the light-transmitting cover 20 may be fixed in the liquid crystal display device 100 of this embodiment.

In this liquid crystal display device 100, the light-transmitting cover 20 is fixed firmly onto the bezel (frame member) 30 which is arranged so as to surround the liquid crystal panel 10 and the other members. More specifically, the bezel 30 includes a side frame portion (sidewall portion) 32 which faces the side surface of the liquid crystal panel 10 and a fixing portion 34 which is arranged at the tip of the side frame portion 32. The light-transmitting cover 20 is fixed onto this fixing portion 34. The fixing portion 34 of the bezel 30 is typically arranged so as to project from the viewer-side surface 10S of the display panel 10 and is fixed onto the light-transmitting cover 20 at a notched portion 20a which is arranged on the side surface of the light-transmitting cover 20.

The bezel 30 is suitably made of a hard metal such as iron and has high rigidity. Examples of suitable materials for the bezel 30 include iron, ferro-alloys such as stainless steel, aluminum alloys, magnesium alloys, and carbon fibers. Also, the side frame portion 32 and fixing portion 34 suitably form integral parts of the bezel 30. The reason is that even if the weight of the light-transmitting cover 20 is applied as a load onto the bezel 30, the bezel 30 does not get damaged easily in that case.

Optionally, the side frame portion 32 of the bezel 30 may be arranged so as to cover not only the display panel 120 but also the side surface of the backlight 40 as well as shown in FIG. 2. The bezel 30 suitably functions as a housing to house the liquid crystal panel 10 and the backlight 40. Inside the bezel 30, the liquid crystal panel 10 and backlight 40 can be fixed and held with good stability by any arbitrary means.

FIGS. 3(a) to 3(c) illustrate, on a larger scale, a region (i.e., the region indicated by the dotted circle in FIG. 2(a))

where the fixing portion 34 of the bezel 30 shown in FIG. 2(a) is fixed onto the light-transmitting cover 20 and illustrate three different exemplary fixing methods.

In the example illustrated in FIG. 3(a), a fixing hole 34a' has been cut through the bezel's fixing portion, and the fixing portion 34a of the bezel 30 is directly secured onto the notched portion 20a of the light-transmitting cover 20 with a screw (which is an exemplary fixing member) 36 to be screwed into the hole 34a'. The notched portion 20a of the light-transmitting cover 20 is suitably formed in a shape that matches the shape of the bezel's fixing portion 34a.

Optionally, a hole to screw in the screw 36 may be cut directly through the light-transmitting cover 20. Alternatively, a metallic screw box may be secured to the light-transmitting cover 20 by either adhesion or insert molding, for example, to catch the screw 36 in the box.

On the other hand, in the example illustrated in FIG. 3(b), the fixing portion 34b of the bezel 30 and the notched portion 20a of the light-transmitting cover 20 are directly bonded together with some adhesive member 37 such as an adhesive agent or an adhesive sheet. As the adhesive member 37, a strong double-coated tape produced by 3M Company may be used, for example.

And in the example illustrated in FIG. 3(c), the fixing portion 34c of the bezel 30 has a crooked key cross-sectional shape. In this case, the fixing portion 34c is bent toward the central portion of the light-transmitting cover 20.

The notched portion 20c of the light-transmitting cover 20 also has a groove 20c' which has been cut toward the central portion of the light-transmitting cover 20 to have a shape that matches that of the fixing portion 34c. The bezel 30 and the light-transmitting cover 20 are fixed to each other by inserting the bent tip portion of the fixing portion 34c into this groove 20c' (i.e., by fitting the tip portion and the groove to each other). In addition, the fixing portion 34c and the notched portion 20c are tightly bonded together with an adhesive 37.

As can be seen, if the fixing portion 34c of the bezel 30 has a bent portion (or a raised or depressed portion), the bezel and the light-transmitting cover can be easily fixed together with good stability, which is advantageous. Alternatively, the bent portion may also have any of various other shapes. For example, the bent portion may have a bending angle of less than 90 degrees or more than degrees. Optionally, such bent portions may also be arranged here and there at some intervals along a side of the liquid crystal panel 10.

Furthermore, the fixing methods shown in FIGS. 3(a) to 3(c) may be used in combination. For example, the fixing portion 34c with the bent portion shown in FIG. 3(c) may be not only bonded with an adhesive but also secured even more tightly with a screw or any other fixing member. An appropriate fixing method may be selected according to the materials, sizes, required strengths and other parameters of the light-transmitting cover 20 and bezel 30.

Figure 4:
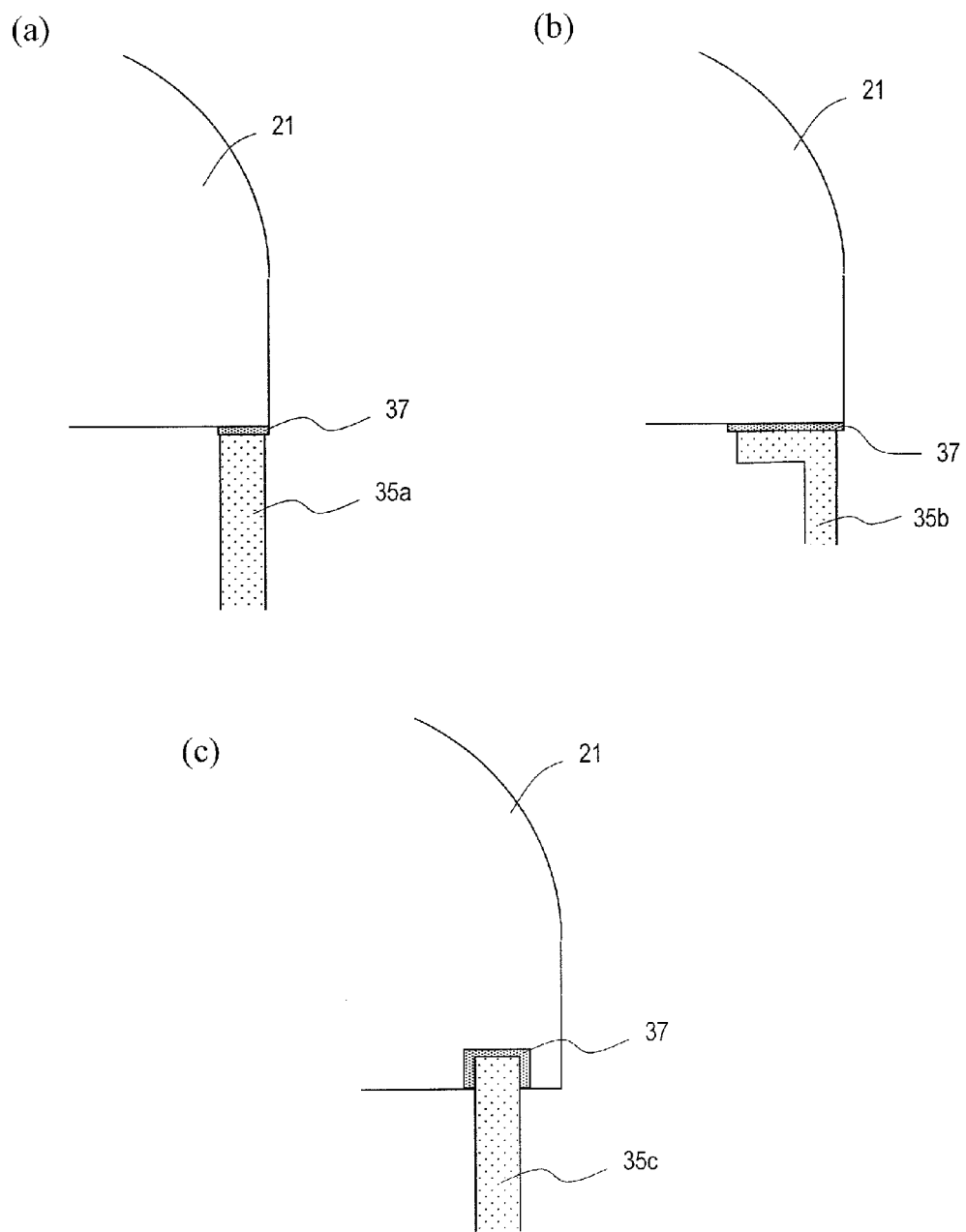
FIG. 4 (a) to (c) are cross-sectional views illustrating three other different methods of fixing a bezel and a light-transmitting cover to each other.

FIGS. 4(a) to 4(c) illustrate other embodiments. In the embodiments illustrated in FIGS. 4(a) and 4(b), no notched portion has been cut through the light-transmitting cover 21, and the bezel's fixing portion 35a, 35b is bonded onto the bottom (back surface) of the light-transmitting cover 21 with an adhesive 37. On the other hand, in the example illustrated in FIG. 4(c), a notched portion (groove) has been cut through the bottom of the light-transmitting cover 21 and the tip portion (fixing portion) 35c of the bezel is fitted into this groove and bonded with the groove with an adhesive 37.

In each of these alternative embodiments, the fixing portion 35a, 35b, 35c of the bezel 30 hardly projects out of the viewer-side surface of the liquid crystal panel 10. These fixing methods can be adopted. However, with any of these methods adopted, the fixing strength could be insufficient particularly when the display device is arranged with the longer sides running horizontally. For that reason, as already described with reference to FIGS. 3(a) through 3(c), it is recommended that the bezel 30 (fixing portion 34) be arranged so as to project out of the viewer-side surface of the display panel 10 and the fixing portion 34 be firmly fixed onto the side surface of the light-transmitting cover 20.

In the embodiments described above, the bezel 30 and the light-transmitting cover 20 are supposed to be made separately and then fixed to each other by any of various methods. However, a light-transmitting cover 20 to which the bezel 30 has been secured in advance may be formed by insert molding technique.

Now it will be described where the fixing portion 34 of the bezel 30 and light-transmitting cover 20 need to be fixed to each other.

FIGS. 5(a) and 5(b) illustrate how part of the light emitted from a peripheral display area of the liquid crystal panel 10 gets refracted by the lens surface (convex curved surface) 22S of the lens portion 22 of the light-transmitting cover 20 arranged in the frame area RF and travels along a normal to the panel screen. FIGS. 5(a) and 5(b) respectively illustrate where the light travels on the left- and right-hand sides of the liquid crystal display device 100.

As shown in these drawings, the light passing through the lens portion 22 is used to display an image in front of the frame area RF. That is why the fixing portion 34 of the bezel 30 and the fixing portion (such as the notched portion) of the light-transmitting cover 20 are suitably arranged at such a position as not interfering with the passage of the light that has been emitted onto the frame area. For that purpose, the fixing portion 34 of the bezel 30 is suitably arranged outside of the path of light L1 which travels along a normal to the panel screen of the display panel 10 from an end portion of the display area RA (i.e., the peripheral display area) of the liquid crystal panel 10 and through an end portion of the lens portion 22 of the light-transmitting cover 20.

In FIGS. 5(a) and 5(b), a region Rn outside of the light L1 (i.e., a region that the light does not reach) is indicated by the dashed lines. If the fixing portion 34 and notched portion 20a are provided in this region Rn, the frame area RF can be made less sensible to the viewer's eye without interfering with the display operation.

It should be noted that the range of the region Rn is defined by the widths W1 and W2 of the frame area, the width W3 of the lens portion, the shape of the lens surface 22S that the lens portion 22 has, and other parameters. Also, an appropriate thickness t1 of the light-transmitting cover 20 may be determined by the widths W1 and W2 of the frame area RF. If the thickness of the light-transmitting cover 20 is increased, the broad frame area can be made less sensible to the viewer's eye. Specifically, the thickness t1 of the light-transmitting cover 20 may be set to be approximately 2.7 to 4.6 times as large as the width (maximum width) of the frame area, for example. If the thickness t1 of the light-transmitting cover 20 is set to go beyond that range, then the weight of the cover will increase but the fixing portion 34 can be designed to have an increased size, because the region Rn expands in that case.

In this embodiment, in a display device with a diagonal size of 60 inches, the frame width W1 on the left side is set to be 2.4 mm, the frame width W2 on the right side is set to be 4.1 mm, the thickness t1 of the light-transmitting cover 20 is set to be 20.0 mm, the width W3 of the lens portion 22 is set to be 21.9 mm, and the lens surface 22S forms an aspheric surface which is defined by a radius of curvature of 28.9 mm and an aspheric coefficient of 0.75. When these specific sizes were adopted, the fixing portion 34 could be provided appropriately in the region Rn that the light did not reach. As a result, the bezel 30 could be fixed with good stability onto the light-transmitting cover 20 without affecting the display operation on the frame area.

The light-transmitting cover 20 and the bezel 30 do not have to be fixed to each other by one of the methods that have been described for the embodiments. Instead, any cover shape and any bezel shape may be adopted to fix them to each other. In any case, however, they are suitably fixed to each other within the region Rn that the light does not reach in order to avoid interfering with the display operation.

Next, it will be described what shape the lens surface 22S of the lens portion 22 may have.

The lens surface 22S may have a circular cylindrical side surface, for example. Alternatively, the lens surface 22S may also be a curved surface defined by a curve which is represented by the following exemplary aspheric surface equation (more specifically, a curved surface in which the intersection between a cross section that is perpendicular to the boundary between the peripheral display area and the frame area and the lens surface is a curve represented by the following equation). Still alternatively, the lens surface 22S may also be a free-form surface.

The shape of the lens surface 22S (i.e., the curve of the cross section described above) may be defined by the following aspheric surface equation using a radius of curvature R1 (a curvature c) and an aspheric coefficient (Cornic constant) k:

Aspheric Surface Equation: $$f(x)=Y-cx^2/(1+(1-(1+k)c^2x^2)^{1/2})$$

where $c=1/R1$, x is the horizontal distance from the center of the lens, and Y is the height at the top of the lens (boundary between the lens portion and the flat portion), i.e., the thickness t1 of the flat portion 24.

The shape of the lens surface 22S of the light-transmitting cover 20 is disclosed in detail in PCT International Application Publications Nos. 2009/157150 and 2010/070871, the entire disclosures of which are hereby incorporated by reference. The lens surface shapes disclosed in these patent documents may be used in an embodiment of the present invention, too.

Figure 6:
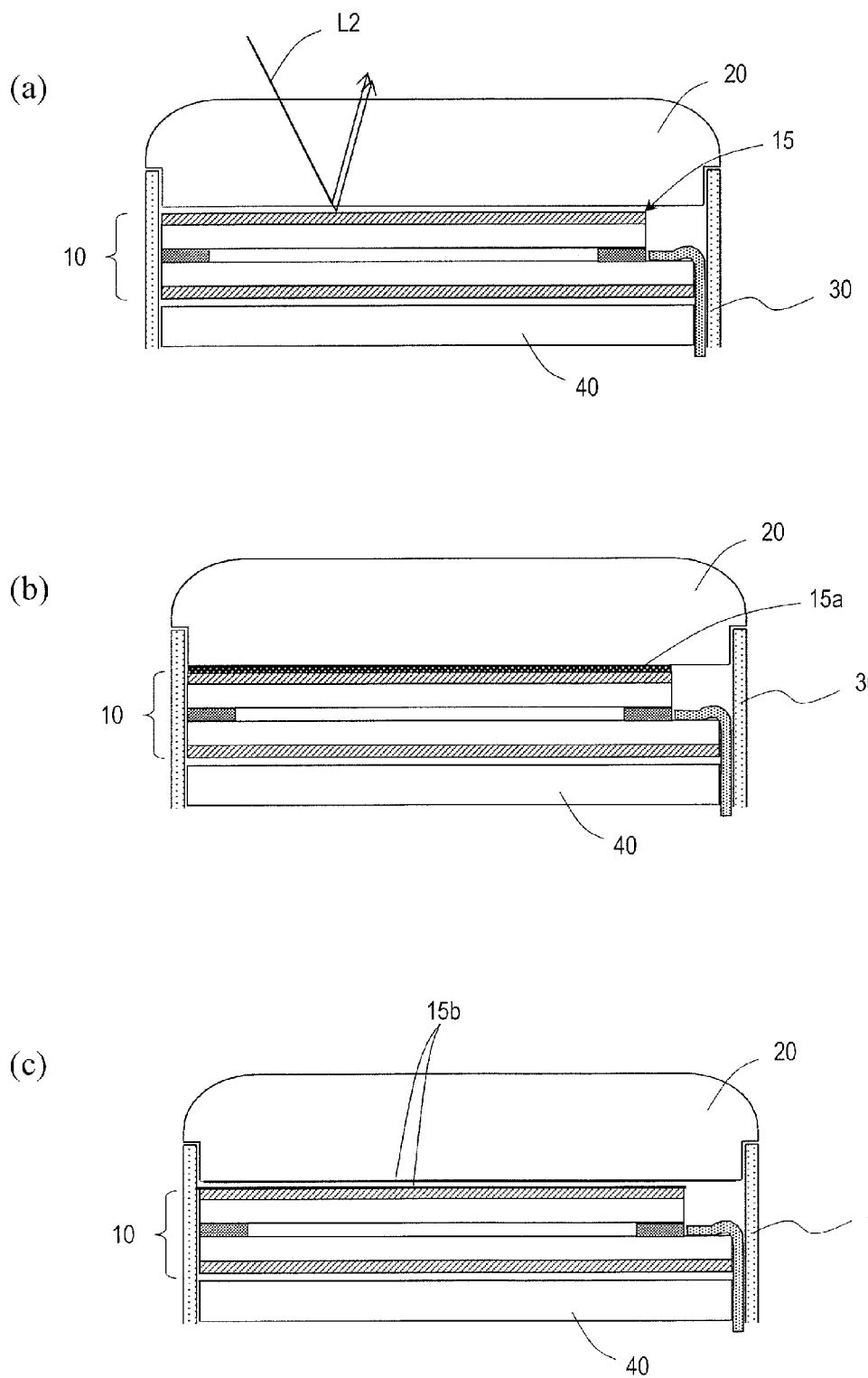
FIG. 6 Cross-sectional views illustrating how a gap may be left between the light-transmitting cover and the liquid crystal panel, wherein (a) illustrates an example in which an air layer has been formed, (b) illustrates an example in which the gap is filled with a filler, and (c) illustrates an example in which an optical element is arranged there.

FIGS. 6(a) to 6(c) illustrate an embodiment in which a gap 15 is left between the back surface of the light-transmitting cover 20 and the surface of the liquid crystal panel 10.

In this embodiment, the light-transmitting cover 20 is not directly fixed onto the surface of the display panel 10. For example, in the example illustrated in FIG. 6(a), the gap 15 left between the light-transmitting cover 20 and the surface of the display panel 10 is filled with the air. That is to say, an air layer is arranged between the light-transmitting cover 20 and the display panel 10, and the light-transmitting cover 20 and display panel 10 are not directly in contact with each other.

If such an air layer is provided, the air layer can be used effectively to relax the stress to be caused when the light-transmitting cover 20 expands, for example. However, by providing the air layer (with a refractive index of 1.0), ambient light which has passed through the light-transmitting cover 20 could be reflected from an interface with a different refractive index (i.e., the back surface of the light-transmitting cover 20). In that case, the contrast ratio of the image displayed could decrease.

On the other hand, in the example illustrated in FIG. 6(b), the gap between the light-transmitting cover 20 and the surface of the display panel 10 is filled with a filler 15a which has a higher refractive index than the air (i.e., of which the refractive index is greater than 1.0) and which will be hereinafter referred to as a "gap filler". As such a gap filler 15a, any of various pressure sensitive adhesives or gel materials may be used. For example, a silicone gel or silicone rubber may be used. It is particularly suitable to interpose a pressure sensitive adhesive or gel material, of which the refractive index is close to 1.5, because interfacial reflection can be minimized and because the light-transmitting cover 20 and the display panel 10 can be kept freely movable in that case.

This gap filler 15a does not have the function of directly fixing the light-transmitting cover 20 and the display panel 10 to each other. That is to say, the gap filler 15a should not be a material which binds the light-transmitting cover 20 and the display panel 10 together so firmly as to totally constrain the thermal expansion of the light-transmitting cover 20. As the gap filler 15a, a material, of which the shear storage modulus G' is $10^6$ Pa or less, is suitably used.

Meanwhile, FIG. 6(c) illustrates an example in which an optical element 15b is arranged in the gap between the back surface of the light-transmitting cover 20 and the surface of the display panel 10. In this example, the optical element 15b is an antireflective film and may be implemented as any of various antireflection structures (including an evaporated film, a coating film and a moth-eye structure). Alternatively, an anti-glare film or a light diffusion film may be provided as the optical element 15b. Still alternatively, a micro lens array or a lenticular lens may be provided as well.

As can be seen, in the liquid crystal display device 100 of this embodiment, the light-transmitting cover 20 and the display panel 10 are not directly bonded together with an adhesive layer, and therefore, any kind of optical element 15b may be easily arranged between them.

Still alternatively, a plurality of micro-geometric depressions and/or projections may be directly formed on the back surface of the light-transmitting cover 20. In this embodiment, no adhesive layer is provided on the back surface of the light-transmitting cover 20 and the light-transmitting cover 20 can be configured to have its back surface exposed to the air (i.e., contact with a medium with a significantly different refractive index). That is why those depressions and projections provided on the back surface of the cover can be used effectively to diffuse light, for example.

Figure 7:
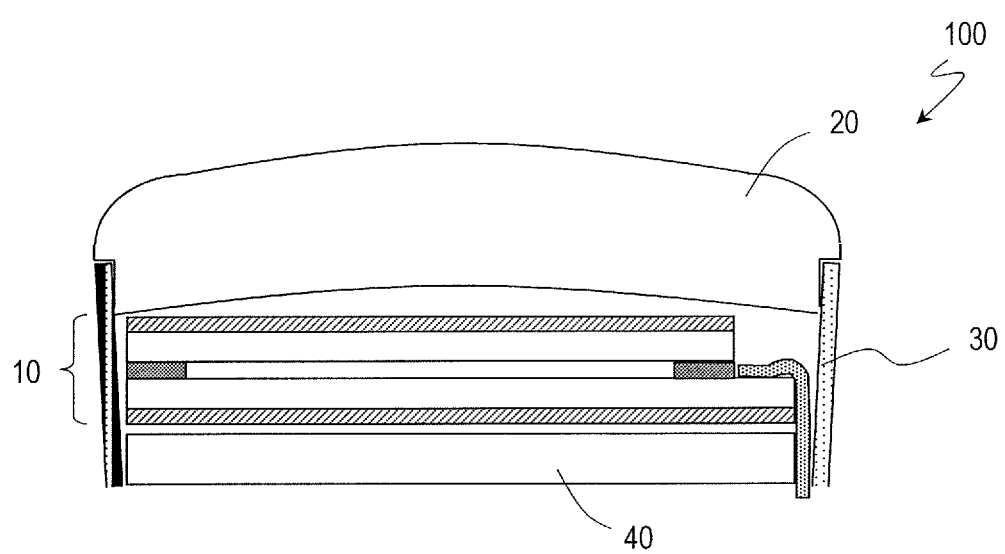
FIG. 7 A cross-sectional view illustrating how the liquid crystal display device 100 of the first embodiment will look when the device has expanded (or been deformed) due to a variation in temperature or humidity.

FIG. 7 illustrates how the liquid crystal display device 100 changes under a high-temperature environment (e.g., at an ambient temperature of 60° C.). As shown in FIG. 7, in such a high-temperature environment, the light-transmitting cover 20 itself or the bezel 30 gets deformed due to thermal expansion. However, it is still possible to prevent the light-transmitting cover 20 secured to the bezel 30 from dropping off the liquid crystal display device 100.

As can be seen, in the liquid crystal display device 100 of this embodiment, even if there is some difference in the magnitude of expansion or shrinkage between the material of the light-transmitting cover 20 and the main material (typically the substrate material) of the liquid crystal panel 10, no stress will be caused, because the light-transmitting cover 20 and the liquid crystal panel 10 are not directly bonded together but are freely movable. Instead, the light-transmitting cover 20 will expand or shrink relatively freely. Nevertheless, since the light-transmitting cover 20 is directly secured to the bezel 30, one or both of the light-transmitting cover 20 and the bezel 30 may warp to a certain degree, but the light-transmitting cover 20 can still be held appropriately. Consequently, even if the light-transmitting cover 20 expands or shrinks due to a variation in temperature or absorption of moisture, it is still possible to prevent the light-transmitting cover 20 from dropping off the liquid crystal display device 100.

Also, the liquid crystal display device 100 of this embodiment has a structure in which the light-transmitting cover 20 and liquid crystal panel 10 are not directly bonded together with an adhesive, for example, but in which the light-transmitting cover 20 is fixed with the bezel 30. That is why the position of the light-transmitting cover 20 can be finely adjusted easily with respect to the liquid crystal panel 10, which is also advantageous. For example, if the light-transmitting cover 20 is going to be screwed onto the bezel 30, the relative position of the light-transmitting cover 20 with respect to the liquid crystal panel 10 can be finely adjusted by changing the degree of tightening the screw in the last process step, for example. Optionally, it is also possible to provide in advance a position adjusting mechanism for adjusting the position of the light-transmitting cover 20 with respect to the liquid crystal panel 10 after the light-transmitting cover 20 has been fixed onto the bezel 30. In any case, compared to a situation where the light-transmitting cover 20 and the liquid crystal panel 10 are directly bonded together with an adhesive, for example, positioning can be done more easily.

(Embodiment 2)

Figure 8:
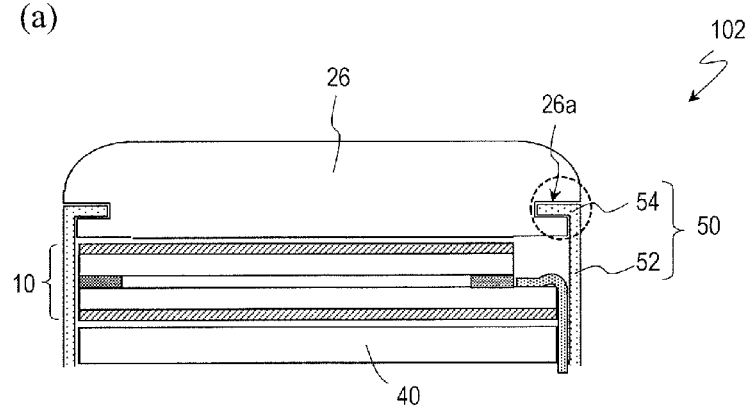
FIG. 8 Illustrates a liquid crystal display device 102 as a second embodiment of the present invention, wherein (a) and (c) are cross-sectional views as viewed horizontally and vertically to the panel, and (b) is a plan view of its liquid crystal panel 10.
Figure 8:
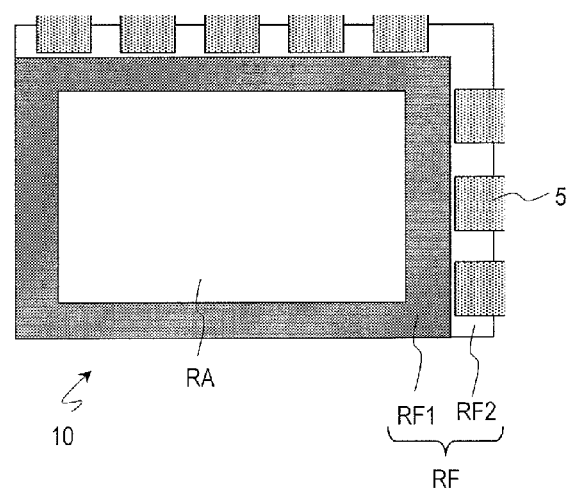
Figure 8:
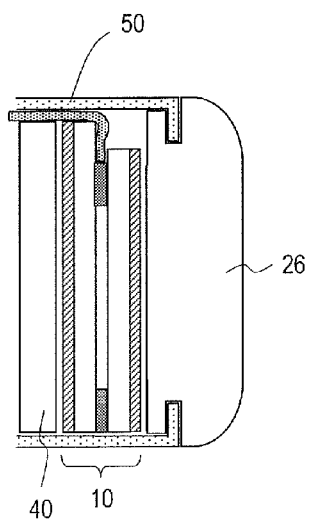

FIGS. 8(*a*) to 8(*c*) illustrate a liquid crystal display device 102 as a second embodiment. In this liquid crystal display device 102, the fixing portion 54 of the bezel 50 has a crooked key cross section and such a fixing portion 54 is fitted into the notched portion (recess) 26*a* of the light-transmitting cover 26 as in the example illustrated in FIG. 3(*c*).

Figure 3:
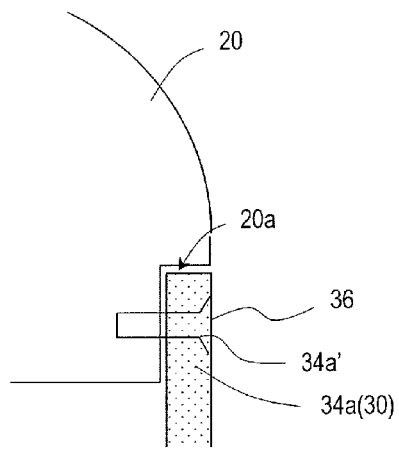
FIG. 3 (a) to (c) are enlarged cross-sectional views illustrating three different methods of fixing a bezel and a light-transmitting cover to each other.
Figure 3:
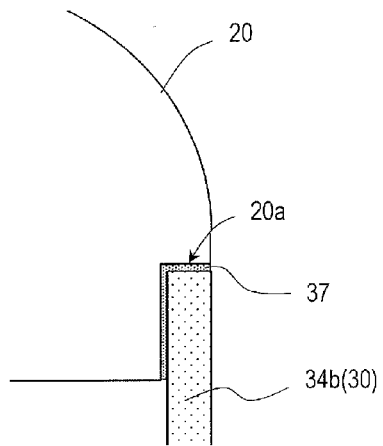
Figure 3:
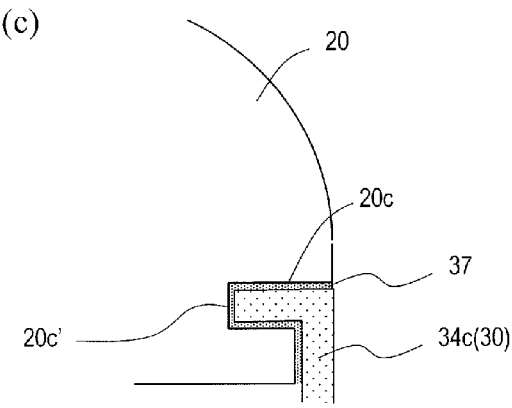

However, unlike the example illustrated in FIG. 3(*c*), the notched portion 26*a* and the fixing portion 54 are not bonded together in this embodiment with the adhesive 37. Instead, the bezel's (50) fixing portion 54 with the crooked key cross section is fitted into the recess 26*a* with a certain gap left between them, and can move slightly.

Figure 9:
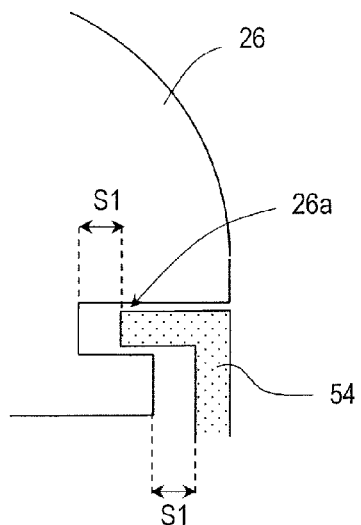
FIG. 9 Enlarged cross-sectional views illustrating how the bezel and light-transmitting cover may be fixed to each other, wherein (a) and (b) illustrate how the light-transmitting cover looks before and after its expansion and (c) illustrates a different example.
Figure 9:
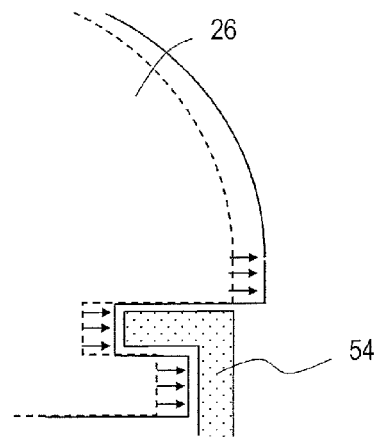
Figure 9:
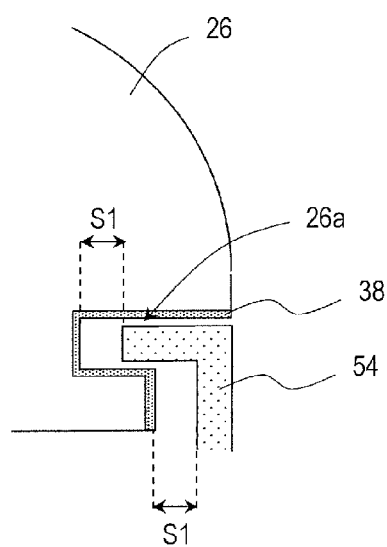

FIG. 9(*a*) illustrates, on a larger scale, the vicinity of the crooked key fixing portion 54 at an ordinary temperature. As shown in FIG. 9(*a*), at an ordinary temperature, the fixing portion 54 of the bezel 50 and the light-transmitting cover 26 are loosely fixed to each other with a certain gap left between them.

That is why even if the light-transmitting cover 26 has expanded as shown in FIG. 9(*b*) due to a rise in ambient temperature, for example, the light-transmitting cover 26 or the bezel 50 hardly gets flexed or warped until the fixing portion 54 of the bezel 50 contacts with the bottom of the recess (groove) 26*a* of the light-transmitting cover 26. Once they contact with each other, some flexure or warp will be produced. Still, the light-transmitting cover 26 can continue to be fixed stably with a smaller degree of deformation caused compared to the example illustrated in FIG. 3(*c*).

For example, if the screen size is 60 inches and if the material of the cover is an acrylic resin, then the light-transmitting cover 26 will expand by about 3.6 mm when kept in a high-temperature environment of 60° C. compared to when kept at 20° C. If the width S1 of the gap left between the notched portion 26*a* and the fixing portion 54 is equal to or greater than 3.6 mm both sides combined, the light-transmitting cover and the bezel 50 are hardly deformed even under an environment of 60° C. Even if the width S1 of the gap is equal to or smaller than 3.6 mm, the degrees of deformation of the light-transmitting cover 26 and the bezel 50 can still be reduced compared to a situation where no gap is left between them.

The width S1 of the gap may be appropriately determined by the size or material of the light-transmitting cover 26. Supposing the screen size is 60 inches, the cover is made of an acrylic resin, and the temperature difference is ±40 degrees, the width S1 of the gap may be set so that the sum of the widths S1 of the gaps left on the right- and left-hand sides becomes equal to or smaller than 3.6 mm (i.e., the gap on one side becomes equal to or smaller than 1.8 mm that is a half of 3.6 mm).

FIG. 9(*c*) illustrates a fixing method according to a modified example. In the modified example illustrated in FIG. 9(*c*), the notched portion 26*a* of the light-transmitting cover 26 is coated with a thin metallic plate 38.

Particularly in a situation where the light-transmitting cover 26 is made of a relatively easily crackable material such as an acrylic resin, if the light-transmitting cover 26 continues to be connected to the fixing portion 54 in a crooked key groove for a long time, then the cover may deteriorate and get damaged in some cases. However, if the notched portion 26*a* is reinforced with the metallic plate 38 as is done in this embodiment, such deterioration with time can be avoided.

To obtain such a metallic plate 38 to protect the notched portion 26*a*, a thin plate of iron or stainless steel (with a thickness of 0.1 to 0.3 mm, for example) may be pressed into a shape matching the notched portion 26*a* and then fitted into the notched portion 26*a*.

In this case, if the metallic plate 38 and the light-transmitting cover 26 were bonded together with an adhesive, for example, the fixing portion could be deformed due to a difference in their coefficient of expansion to be caused by a variation in temperature, for example, which is not a very favorable situation. For that reason, it is recommended that the metallic plate 38 and the light-transmitting cover 26 be either loosely bonded together with an adhesive, adhesive sheet or gel tape that does not get cured completely or just loosely fitted into each other without using any adhesive. In that case, even if the material expands or shrink to a certain degree, no strain will be produced between the metallic plate 38 and the cover 26.

Figure 5:
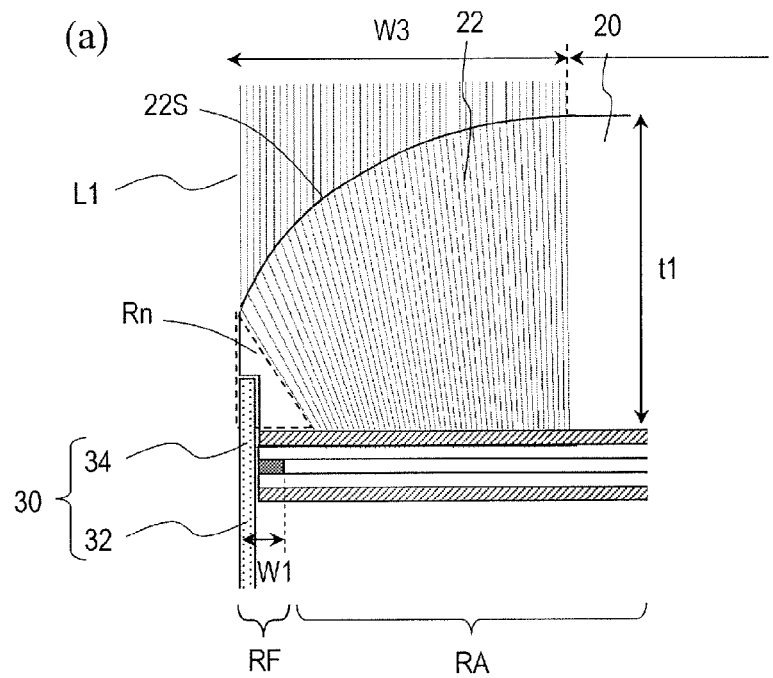
FIGS. 5 (a) and (b) are cross-sectional views illustrating the paths of light passing through a lens portion (curved portion) of the light-transmitting cover on right and left sides of a liquid crystal display device and the position of a fixing portion.
Figure 5:
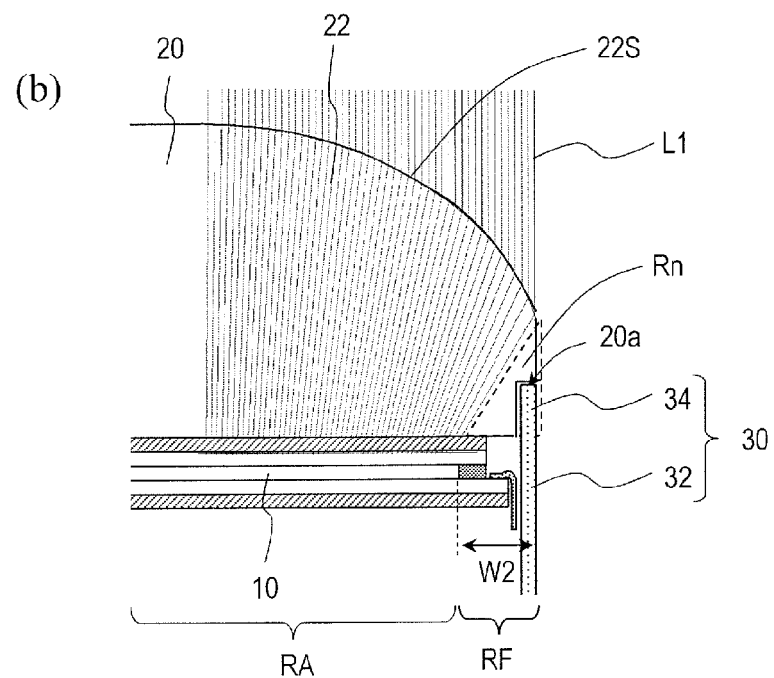
Figure 10:
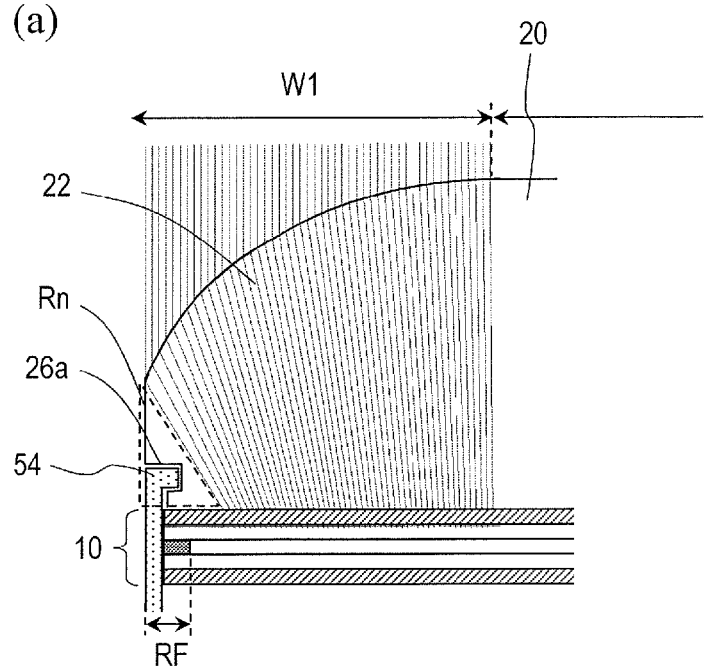
FIGS. 10 (a) and (b) are cross-sectional views illustrating the paths of light passing through a lens portion (curved portion) of the light-transmitting cover on right and left sides of a liquid crystal display device and the position of a fixing portion.
Figure 10:
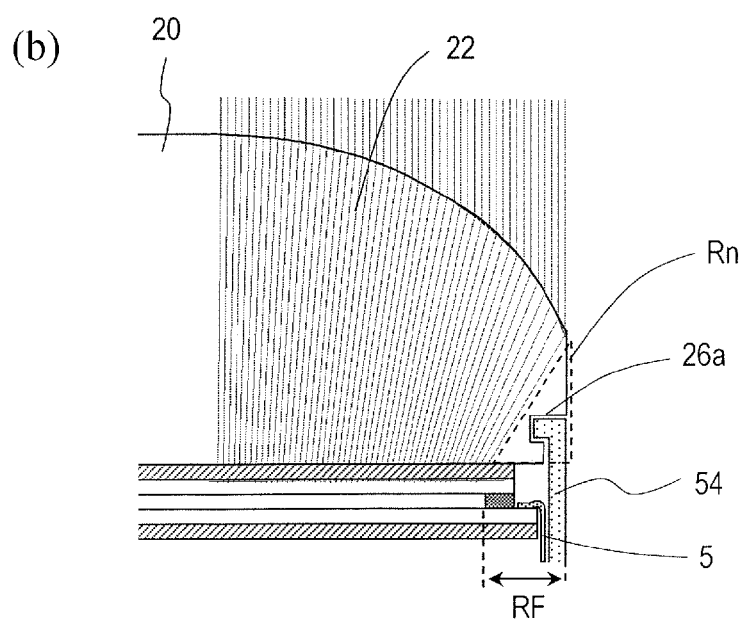

FIGS. 10(*a*) and 10(*b*) illustrate how the light that has been emitted from the display screen of the liquid crystal panel 10 gets refracted by the lens portion 22 as in FIGS. 5(*a*) and 5(*b*). No matter what structure the bezel and other members have, they never interfere with the display operation within the region Rn that the light does not reach in the vicinity of the end face of the display device. That is why any arbitrary cover or bezel shape may be adopted unless those members stick out of this region Rn.

As can be seen from the foregoing description, the liquid crystal display device 102 of this second embodiment can further reduce the degree of deformation of the light-transmitting cover 26 or the bezel 50. A gap is left between the light-transmitting cover 26 and the bezel 50. That is why even when the cover expands thermally, the degree of deformation of the light-transmitting cover 26 or bezel 50 can be reduced by the size of the gap, and the light-transmitting cover 26 can be kept fixed firmly.

(Embodiment 3)

Figure 11:
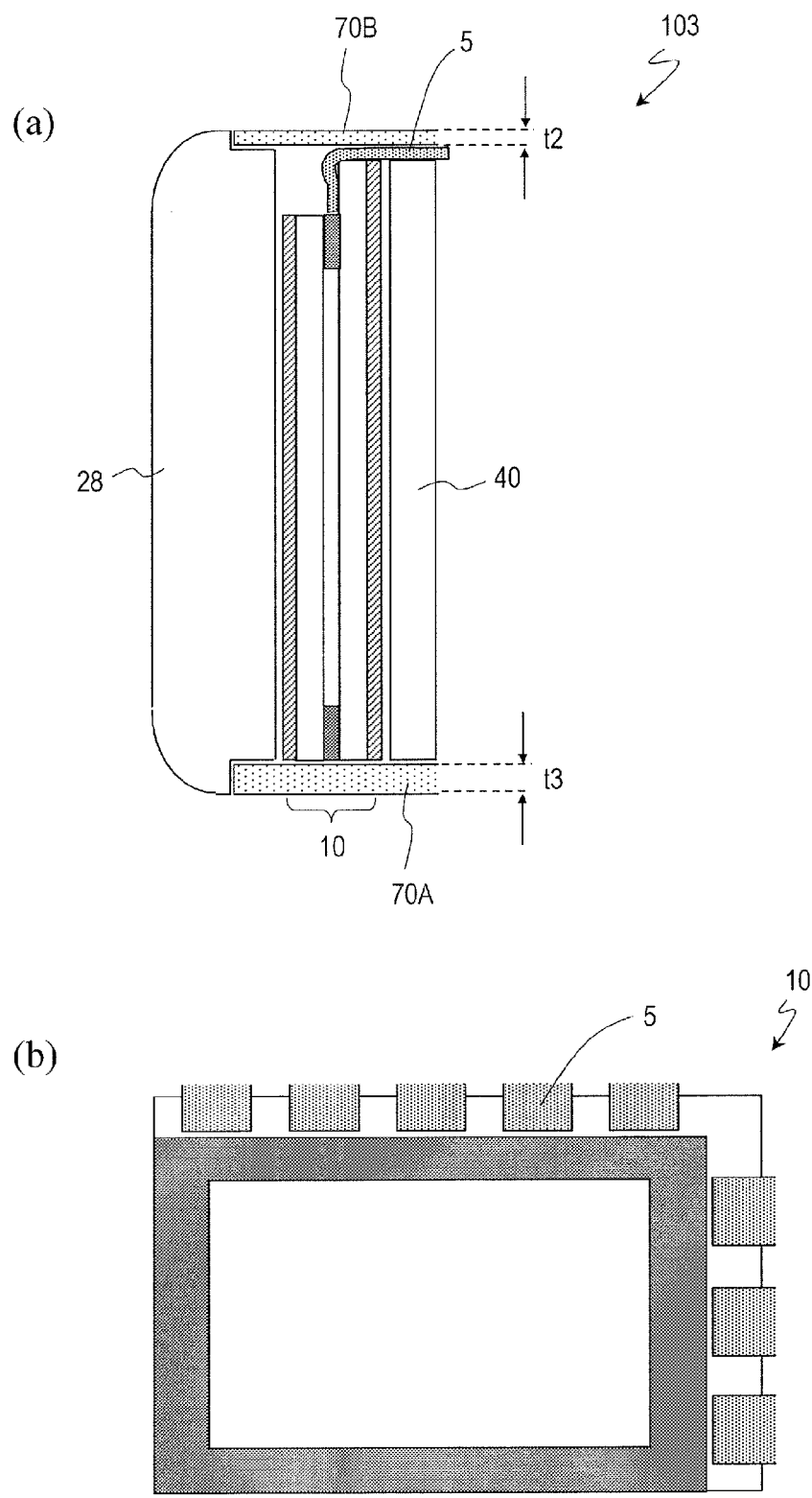
FIG. 11 Illustrates a liquid crystal display device 103 as a third embodiment of the present invention, wherein (a) is cross-sectional view as viewed vertically to the panel when the display device is arranged with the longer sides running horizontally, and (b) is a plan view of its liquid crystal panel 10.

FIG. 11(*a*) illustrates a liquid crystal display device 103 as a third embodiment. In the liquid crystal display device 103 of this embodiment, the bezel 70A, 70B has different thicknesses on two opposing sides of the liquid crystal panel 10, which is a major difference from the liquid crystal display device 100 of the first embodiment described above.

The liquid crystal display device 103 of this third embodiment works fine particularly when arranged with the longer sides running horizontally. If the liquid crystal display device 103 is arranged with the longer sides running horizontally, then the light-transmitting cover 28 will be supported mainly by one (i.e., the lower one) of the four sides of the bezel (which will be hereinafter referred to as a "bezel 70A") that surrounds the liquid crystal panel 10. If the lower bezel 70A were fragile, then the bezel 70A could not support the load imposed by the weight of the light-transmitting cover 28 for a long time but would get bent or broken. As a result, the light-transmitting cover 28 might drop off. For that reason, the lower bezel 70A to support the light-transmitting cover 28 suitably has sufficient rigidity. Thus, in this embodiment, the thickness t3 of the lower bezel 70A is set to be greater than the thickness t2 of the upper bezel 70B.

If the screen size of the display device is 60 inches, the weight of the light-transmitting cover 28 is expected to fall within the range of 10 to 20 kg. In this case, if the lower bezel 70A is made of a hard material such as iron or stainless steel and if its plate thickness is set to be 2 to 3 mm, then the lower bezel 70A would be strong enough to bear the weight of the light-transmitting cover 28. Optionally, the rigidity of the bezel 70A can be increased structurally without increasing the thickness of the bezel 70A. For example, if a plurality of rail members running in the thickness direction of the panel (i.e., horizontally on the paper on which FIG. 11(*a*) is drawn) are provided for only the lower bezel, the rigidity of the bezel with respect to the vertical load can be increased without changing the thickness of the bezel.

If the thickness of the lower bezel 70A was increased, then the frame width might increase on the lower side. However, the non-terminal region of the liquid crystal panel 10 for which no FPCs are provided has a narrower frame width than the terminal region in the first place as shown in FIG. 11(*b*). That is why as long as the liquid crystal display device 103 is arranged with the non-terminal region facing down, even if the thickness of the bezel 70A is increased, the frame width on the lower side will only be at most approximately as large as the frame width of the upper side (i.e., the terminal region). The thickness of the light-transmitting cover 28 is determined by the broader frame width. That is why even if the thickness of the bezel 70A on the non-terminal region side is increased, there is no need to increase the thickness of the light-transmitting cover 28. For that reason, the thicker bezel 70A is suitably arranged on one side of the liquid crystal panel on which the terminal region is not provided.

In the example illustrated in FIGS. 11(*a*) and 11(*b*), the liquid crystal display device is supposed to be arranged with the longer sides running horizontally. However, in some cases, the liquid crystal display device may also be arranged with the longer sides running vertically. In that case, the thickness of the bezel on the left side may be set to be greater than that of the bezel on the right side so that the bezel can support the light-transmitting cover 28 appropriately with one of the left and right sides that is located in the non-terminal region (i.e., the left side in this case) facing down in FIG. 11.

However, as the terminal region may sometimes face down while the liquid crystal display device 103 is being carried, the bezel should have strength that is high enough to avoid breaking easily. Nevertheless, if some mark or something indicating to the user which direction the display device should face when installed is provided, in some cases, the bezel does not have to have strength that is high enough to support the device for a long time with the terminal region facing down. Naturally, it is preferred to increase the thickness of the bezel on the terminal side from the standpoint of mechanical strength. In that case, however, the maximum width of the frame area would increase so much that the thickness of the light-transmitting cover 28 would have to be increased accordingly. That is why this is not beneficial because the weight will increase too much to install the display device easily.

Figure 12:
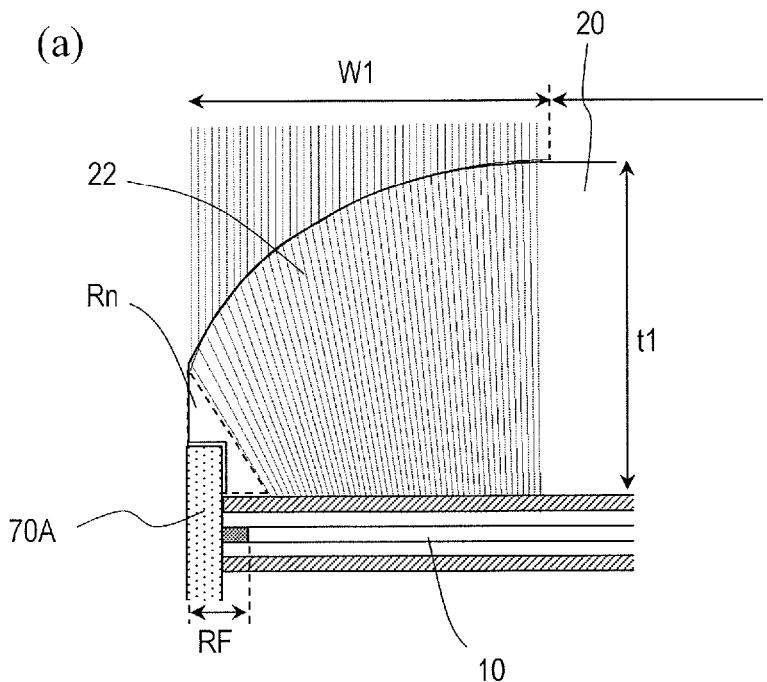
FIGS. 12 (a) and (b) are cross-sectional views illustrating the paths of light passing through a lens portion (curved portion) of the light-transmitting cover on right and left sides of a liquid crystal display device and the position of a fixing portion.
Figure 12:
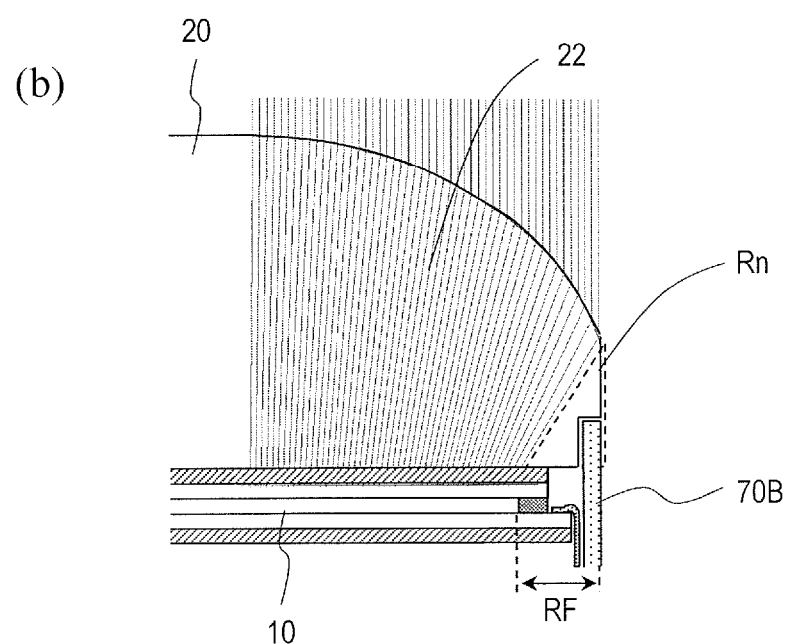

FIGS. 12(*a*) and 12(*b*) illustrate how the light that has been emitted from the display screen of the liquid crystal panel 10 gets refracted by the lens portion 22 as in FIGS. 5(*a*) and 5(*b*). No matter what structure the bezel and other members have, they never interfere with the display operation within the region Rn that the light does not reach in the vicinity of the end face of the display device. That is why any arbitrary cover or bezel shape may be adopted unless those members stick out of this region Rn.

(Embodiment 4)

Figure 13:
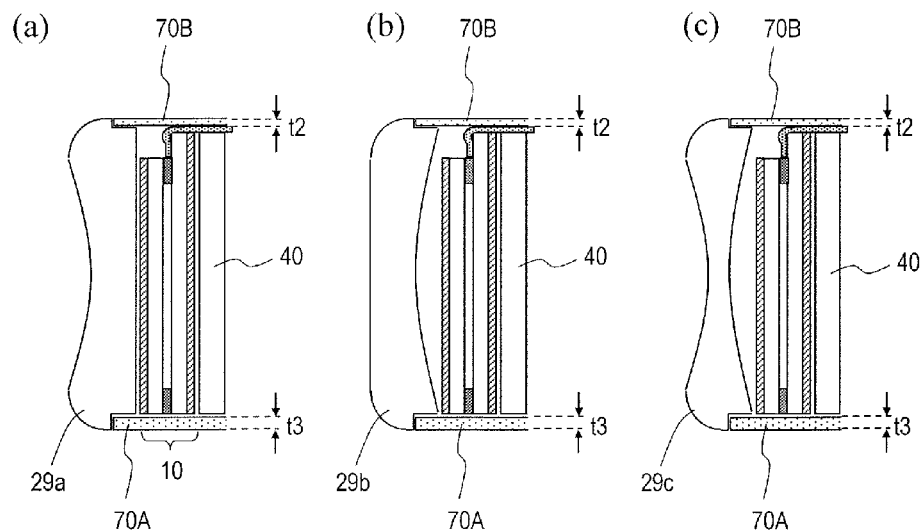
FIG. 13 (a) to (c) are cross-sectional views illustrating still other embodiments of the light-transmitting cover.

FIGS. 13(*a*) to 13(*c*) illustrate liquid crystal display devices according to a fourth embodiment. In the liquid crystal display devices of this fourth embodiment, the central portion of the light-transmitting covers 29a, 29b, 29c is thinner than their peripheral portion, which is a major difference from the liquid crystal display device 103 of the third embodiment described above.

As shown in FIGS. 13(*a*) to 13(*c*), if the central portion of the light-transmitting cover is shaped as a curved surface or discontinuous surfaces to have its thickness reduced, the weight of the cover decreases and the load on the lower bezel can be lightened, which is beneficial. The curved surface in the central portion of the cover may be located closer to the viewer, or closer to the display panel, or on both sides, as shown in FIGS. 13(*a*) to 13(*c*).

According to this embodiment, particularly when the display device is used in a upright position, the light-transmitting cover can be held and supported appropriately, and it is possible to prevent more effectively the bezel from being broken.

(Other Embodiments)

Figure 14:
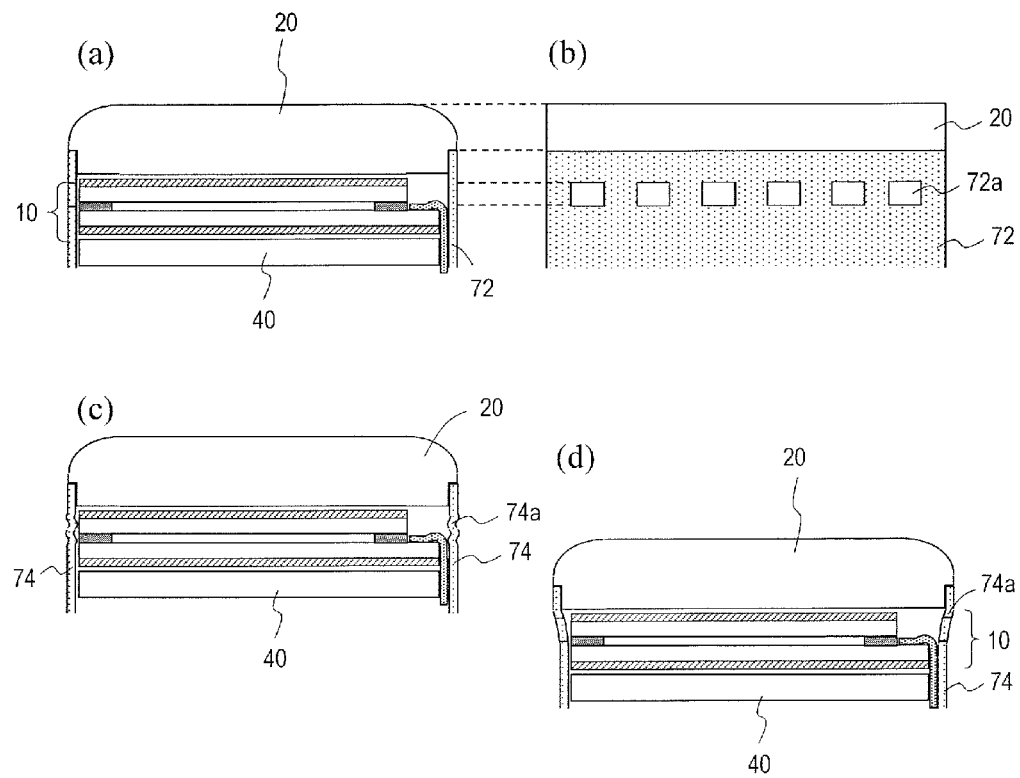
FIG. 14 Illustrates yet other embodiments of the bezel, wherein (a) is a cross-sectional view illustrating an example in which a plurality of holes have been cut through the bezel, (b) is a side view of (a), and (c) and (d) respectively illustrate a state at an ordinary temperature and an expanded state when a bellows portion is provided for the bezel.

FIGS. 14(*a*) and 14(*b*) illustrate an example in which window holes 72a are cut through the bezel 72. On the other hand, FIGS. 14(*c*) and 14(*d*) illustrate an example in which a bellows portion 74a is provided for the side frame portion of the bezel 74.

As shown in FIGS. 14(*a*) and 14(*b*), a number of holes 72a have been cut in line through the bezel 72. By providing such easily deformable portions on purpose for the bezel 72, deformation of other portions can be lessened.

On the other hand, by providing the bellows portion 74a as a part of the bezel as shown in FIG. 14(*c*), even if the light-transmitting cover has expanded, deformation of other portions can be lessened by the deformation of the bezel's bellows portion 74a as shown in FIG. 14(*d*).

As can be seen, by providing such easily deformable portions in the vicinity of the fixing portion of the bezel 72, 74, even when the light-transmitting cover 20 expands, it is possible to prevent the light-transmitting cover 20 from getting warped or flexed. As a result, the displayed image will not look curved or the ambient light reflected will not form a curved path.

Figure 15:
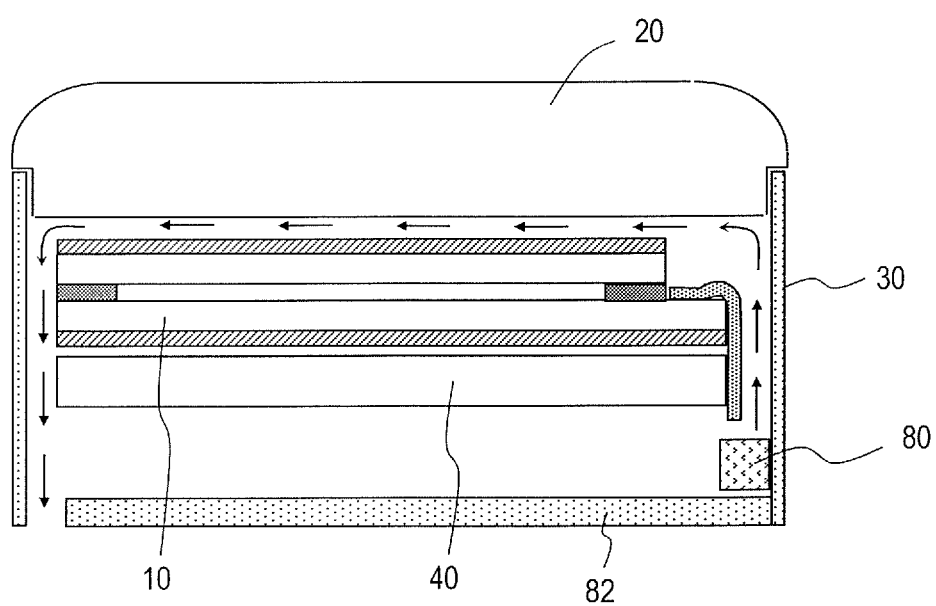
FIG. 15 A cross-sectional view illustrating yet another exemplary bezel.

Optionally, as shown in FIG. 15, the gap left between the light-transmitting cover 20 and the liquid crystal panel 10 may be used effectively to cool the panel so that the flow of the air coming from a cooler (cooling fan) 80 passes across the surface of the liquid crystal panel 10.

By circulating the wind in this manner using the cooler 80, for example, a rise in the temperature of the light-transmitting cover 20, or its deformation and expansion, can be reduced, and therefore, the warp of the light-transmitting cover 20 and bezel 30 can be minimized, too. It should be noted that the air that has cooled the liquid crystal panel 10 and the light-transmitting cover 20 may be exhausted out of the device through an exhaust port which is provided at an end of a rear plate 82 behind the backlight 40. Furthermore, not only such an air cooling system using wind but also a water cooling system using cooling water may be used as well.

The display device described above can be used effectively in a multi-display system. Since the light-transmitting cover's lens portion can make the frame area less sensible to the viewer's eye, the seams of the multi-display system can be made less perceptible to him or her. In addition, even when the ambient temperature rises, for example, the light-transmitting cover can also be held appropriately.

As the display panel, not only the liquid crystal panel described above but also an organic EL panel, an FED (field emission display) panel, an electrophoretic display panel, an LED display panel, or a display panel operating in the electro-wetting method may be used as well. Alternatively, a plasma display panel or a display panel which uses mobile fine particles for use in electronic paper may also be used.

Optionally, a display device according to an embodiment of the present invention may also be configured to be combined with a touchscreen panel. The touchscreen panel may adopt any of various configurations. When the display device is combined with an electrostatic capacitive touchscreen panel, the light-transmitting cover described above can be used as a transparent cover which allows the user to manipulate the front panel (i.e., the operating panel) of the touchscreen panel. In that case, the transparent cover is directly fixed onto the bezel.

INDUSTRIAL APPLICABILITY

A display device according to an embodiment of the present invention can be used extensively as a TV monitor or any of various other display devices, and can be used particularly effectively as a display device for a multi-display system that forms a huge display screen.

REFERENCE SIGNS LIST

5 FPC
10 liquid crystal panel
12 TFT substrate
14 counter substrate
16 liquid crystal layer
18 seal member
19a, 19b polarizer
20 light-transmitting cover
22 lens portion
24 flat portion
30 bezel
32 side frame portion
34 fixing portion
40 backlight
100 liquid crystal display device
RA display area
RF frame area

The invention claimed is:

1. A display device comprising:
a display panel;
a light-transmitting cover which is closer to a viewer than the display panel so as to cover the display panel and which includes a lens portion at a position corresponding to an end portion of the display panel; and
a bezel including a side frame portion which at least partially covers a side surface of the display panel, wherein
the bezel further includes a fixing portion which is at a tip of the side frame portion and in the vicinity of a side surface of the light-transmitting cover,
the light-transmitting cover and the fixing portion of the bezel are directly fixed to each other,
the light-transmitting cover includes a notched portion, which is directly fixed onto the fixing portion of the bezel,
the fixing portion of the bezel has a bent tip portion, the notched portion of the light-transmitting cover has a groove, of which a shape of the notched portion matches a shape of the bent tip portion, and
the bent tip portion and the notched portion are filter into each other.

2. The display device of claim 1, wherein a viewer-side surface of the display panel and a back surface of the light-transmitting cover are not directly fixed to each other.

3. The display device of claim 1, wherein the fixing portion of the bezel is arranged so as to project out of the viewer-side surface of the display panel.

4. The display device of claim 3, wherein the display panel has a display area and a non-display area which is arranged outside of the display area, and
the fixing portion of the bezel is arranged at such a position as not to prevent light that has been emitted from the end of the display area from passing through the lens portion of the light-transmitting cover and then traveling perpendicularly to the display panel.

5. The display device of claim 1, wherein a gap is left between an end of the bent tip portion and a bottom of the groove of the notched portion of the light-transmitting cover.

6. The display device of claim 1, further comprising a metallic member which covers the notched portion of the light-transmitting cover at least partially.

7. A display device comprising:
a display panel;
a light-transmitting cover which is closer to a viewer than the display panel so as to cover the display panel and which includes a lens portion at a position corresponding to an end portion of the display panel; and
a bezel including a side frame portion which at least partially covers a side surface of the display panel, wherein
the bezel including a fixing portion which is at a tip of the side frame portion and in the vicinity of a side surface of the light-transmitting cover,
the light-transmitting cover and the fixing portion of the bezel are directly fixed to each other, and
the fixing portion of the bezel has a hole which faces the light-transmitting cover, and the bezel and the light-transmitting cover are secured to each other with a fixing member that passes through the hole.

8. The display device of claim 1, wherein the light-transmitting cover and the bezel are bonded together with an adhesive member interposed between the fixing portion of the bezel and the light-transmitting cover.

9. A display device comprising:

a display panel;

a light-transmitting cover which is closer to a viewer than the display panel so as to cover the display panel and which includes a lens portion at a position corresponding to an end portion of the display panel; and a bezel including a side frame portion which at least partially covers a side surface of the display panel, wherein the bezel further includes a fixing portion which is at a tip of the side frame portion and in the vicinity of a side surface of the light-transmitting cover, the light-transmitting cover and the fixing portion of the bezel are directly fixed to each other, the display panel has a substantially rectangular planar shape, the bezel includes first and second bezel portions which are arranged so as to respectively face first and second sides of the display panel that are opposed to each other, and the first and the second bezel portions have mutually different thicknesses.

10. The display device of claim 9, wherein the display panel has a display area and a non-display area which is arranged outside of the display area, the width of the non-display area is broader on the first side than on the second side, a terminal region is arranged in the non-display area along the first side, and the first bezel portion is less thick than the second bezel portion.

11. The display device of claim 1, wherein a central portion of the light-transmitting cover has been formed to be thinner than a peripheral portion of the light-transmitting cover.

12. The display device of claim 1, wherein a gap is left between a viewer-side surface of the display panel and a back surface of the light-transmitting cover and is filled with the air.

13. The display device of claim 1, wherein a gap is left between a viewer-side surface of the display panel and a back surface of the light-transmitting cover and is filled with a filler, of which the refractive index is greater than 1.0 and the shear storage modulus G' is equal to or smaller than $10^6$ Pa.

* * * * *